United States Patent [19]

Assal et al.

[11] Patent Number: 4,637,017
[45] Date of Patent: Jan. 13, 1987

[54] MONITORING OF INPUT BACKOFF IN TIME DIVISION MULTIPLE ACCESS COMMUNICATION SATELLITES

[75] Inventors: Francois T. Assal, Bethesda; Arnold L. Berman; Janaki R. Potukuchi, both of Kensington, all of Md.

[73] Assignee: Communications Satellite Corporation, Washington, D.C.

[21] Appl. No.: 612,496

[22] Filed: May 21, 1984

[51] Int. Cl.$^4$ .......................... H04J 3/06; H04J 15/00; H04J 1/16; H04J 3/14

[52] U.S. Cl. .................................. 370/104; 370/119; 370/17; 455/67; 455/69

[58] Field of Search ...................... 370/104, 95, 98, 17; 455/67, 69, 9, 12, 17

[56] References Cited

U.S. PATENT DOCUMENTS

| | | | |
|---|---|---|---|
| 3,283,249 | 11/1966 | Mitchell | 455/17 |
| 3,315,164 | 4/1967 | Ferguson, Jr. et al. | 455/9 |
| 3,411,088 | 11/1968 | Hutchison | 455/17 |
| 3,456,191 | 7/1969 | Rodenburg et al. | 455/9 |
| 3,487,169 | 12/1969 | Miyagi | 455/12 |
| 4,228,538 | 10/1980 | Scharla-Nielsen et al. | 455/9 |
| 4,408,322 | 10/1983 | Chadwick et al. | 370/104 |

Primary Examiner—Douglas W. Olms
Assistant Examiner—Wellington Chin
Attorney, Agent, or Firm—Sughrue, Mion, Zinn, Macpeak, and Seas

[57] ABSTRACT

A method of measuring input-backoff to an amplifier in a time-division multiple access (TDMA) communication system having a carrier recovery segment and a clock recovery segment prior to a data segment in a traffic burst. A monitoring station transmits a CW pilot signal within the amplifier's bandwidth. In the guard time between bursts, the monitoring station measures the unsuppressed pilot level output by the amplifier. While a ground station is transmitting an unmodulated carrier during carrier recovery or a carrier modulated at the clock frequency during clock recovery, the monitoring station measures the suppressed pilot level, suppressed by the non-linear interaction of pilot and carrier. The amount of pilot suppression is related to the input power back-off of the carrier by a previously measured or a theoretically derived relationship. The carrier-to-suppressed noise ratio is determined by measuring the carrier level during the carrier recovery and by measuring the suppressed noise during carrier or clock recovery through a noise filter centered away from any transmitted signals or their intermodulation products.

10 Claims, 10 Drawing Figures $G_1$ – PREAMBLE GATE
$G_2$ – GUARD SPACE GATE

MONITORING OF INPUT BACKOFF IN TIME DIVISION MULTIPLE ACCESS COMMUNICATION SATELLITES

BACKGROUND OF THE INVENTION

The invention relates generally to time division multiple access communication systems, and it relates, in particular, to monitoring the input power to a transponder of a communication satellite system.

Communication satellites are usually designed to operate with a large number of simultaneous users so that they can receive and retransmit independent and concurrent messages. In the past, the conventional method of handling concurrent messages has been frequency division multiple access (FDMA). In an FDMA system, different channels or communication paths are assigned a different frequency within the bandwidth of the satellite transponder. The satellite is equipped with a wide band receiver and transmitter, such as a travelling wave tube (TWT) which would receive any signal within the wide band and, after a frequency shift, retransmit the signal to the ground stations at a considerably higher power level. The transfer characteristics of a TWT are illustrated in the graph of FIG. 1 in which the input RF power is plotted on the horizontal axis and the output power is plotted on the left vertical axis. The phase change is plotted on the right vertical axis. The output power or amplitude as a function of input power is shown by curve 10 which has a linear portion at lower input power before reaching a saturation peak 12. Both the input and the output power are measured as a back-off from the values at the peak 12. The phase characteristics are shown in curve 14.

A satellite is almost always power limited so that it is desirable to operate at the saturation point 12 in order to obtain maximum output power. However, near saturation, the TWT is very non-linear. A non-linear amplifier causes multiple signals of different frequencies to mix, thereby producing cross-talk between the signals. Therefore in an FDMA system, it is necessary to back-off the input power to a linear portion of the amplitude curve 12 where the operation of the TWT is much more linear. This input back-off, of course, incurs a substantial power penalty.

Some of the recently introduced satellite communication systems use time division multiple access (TDMA). A TDMA communications network is schematically illustrated in FIG. 2 for three ground stations 16, 18 and 20, communicating with each other through a communications satellite 22. The ground stations 16-20 are intended to be remotely located and to be operating with a minimum of local control. A network monitoring station 24 performs a variety of monitoring and supervisory tasks, some of which will be described later. The ground stations 16-20 are time synchronized with each other and each is assigned a particular repeating slot for transmission to the satellite 22. At the input of the satellite 22 the up-link transmissions are interleaved into a serial stream. The satellite changes the carrier frequency of the signal, amplifies the signal and retransmits the serial stream to all of the ground stations 16-20, including the network monitoring station 24, with a minimal change in the content of the signals.

The TDMA data format is illustrated in FIG. 3. Frames repeat on a fixed period, e.g., 2 ms. Each frame is divided into N slots or bursts. The first slot in a frame may be assigned to some housekeeping duties. The remaining slots in each frame are assigned to particular ground stations. Each of the slots is divided into several sequential portions. The first portion is a carrier recovery segment which allows the recovery by a receiving ground station of the precise carrier frequency used by the ground station originating the transmissions for that particular slot. A second portion is the clock recovery segment which allows recovery of the data clock of the transmitting ground station. The carrier and clock recovery segments are collectively called the preamble of the burst. The clock recovery is followed by a unique word which is then followed by the data being transmitted. The data portion has a fixed length for a particular slot but a fraction of the data portion may be vacant because there is no further data to transmit. However, there may be a requirement that data occupy a minimum fraction of the data portion. Finally there is a guard space between slots to allow for equipment variations in the ground stations and also to account for changing path lengths to the satellite. The ground stations 16-20 and the monitoring station 24 need to be synchronized to the extent that transmissions do not overlap, that a ground station 16-20 knows when its own burst occurs, and that the boundaries of the TDMA format are generally known. Because the transmissions are interleaved at the satellite 22, the ground stations need to adjust their own synchronization to that at the satellite taking into account the finite propagation times to and from the satellite.

In TDMA systems, only a single carrier frequency is present at the input of the TWT at any instant so that non-linearity and intermodulation are not problems. Accordingly, the TWT can be operated close to the saturation point 12 of the TWT shown in FIG. 1. Operating at saturation can provide a ten-fold increase in down-link power over FDMA systems, thus increasing the DC to RF conversion efficiency of the satellite.

The hardware of a satellite system is illustrated in more detail in FIG. 4. The ground stations 16, 18 and 20 interleave their transmissions to the satellite 22, which receives all these transmissions on a receive antenna 25. A receiver 26 preamplifies and frequency shifts the received signals. It is common for TDMA systems to operate with several frequency-separated channels. Each channel follows the TDMA format of FIG. 3 although the parameters of the format may differ between channels. the output of the receiver 26 is divided according to frequency to power amplifiers or TWTs 28, 30 and 32 for each of the channels. After power amplification, the signals are recombined and retransmitted through a transmit antenna 34 back down to the ground stations.

Each of the TWTs 28-32 should be operated near its saturation point 12 as shown in FIG. 1. The operation point is determined by the carrier power transmitted by the ground station 16, 18 or 20 for the respective slot. If the carrier power is significantly lower, there is input back-off to the left in FIG. 1 (also called underdrive) with the result that the output power is also reduced. An underdrive condition decreases the uplink carrier-to-noise ratio and the overall bit-error performance of that channel may be degraded by spill-over from unattenuated adjacent channels. On the other hand, overdrive to the right of the saturation point puts the TWT into a highly non-linear region of operation. This non-linearity tends to further spread the spectrum of the band-limited digital signals into the bands occupied by adjacent channels and thereby causes cross-channel interference. It furthermore may degrade the bit-error performance because of bit stream crosstalk and inter-symbol interference caused by bandwidth filtering of the non-linear distorted signals. In some situations, it is desirable to maintain operation in a slight overdrive condition so that additional input back-off introduced by propagation path uncertainties such as rain and humidity will bring the operating point to a slight underdrive condition with a negligible change in the output power. In this case, however, it is necessary to tightly control the operating point so that the overdrive condition does not become extreme, thereby introducing unacceptable non-linearity. Therefore, monitoring the satellite transmitter input drive level and the carrier-to-noise ratio of each burst or slot would be useful in adjusting the burst power transmitted to the satellite, in identifying problems associated with each earth station, and in monitoring any performance degradation of the satellite subsystems.

One method of measuring the input back-off relies upon the non-linearity the TWT in the vicinity of saturation. A low-level CW-carrier or pilot signal is transmitted from one of the ground stations or the monitoring station. The pilot has a frequency within the band of the transponder but offset sufficiently from the center of the band and of sufficiently low power so as not to interfere with the data signal. A measurement is then made at the monitor station of the power level of the pilot signal retransmitted by the TWT in the absence of a data carrier during the guard space. Then data transmission begins from the ground station assigned to the slot following the guard space but the transmission of the pilot signal retransmitted by the TWT continues at the same power level. The monitor station then reexamines the power level of the retransmitted pilot signal. Because of the non-linearity of the TWT, there is intermodulation between the pilot and the data modulated carrier which reduces the signal intensity of the pilot signal. This reduction or suppression of the pilot is a constant function of the input back-off. The TWT can be characterized beforehand by measuring the retransmitted pilot signal levels in the absence of a data carrier and in the presence of a measured data carrier input power. If the saturation peak 12 of the input carrier power is determined by another set of measurements on the carrier input and output powers, then the relation between pilot suppression and input back-off can be characterized by a single set of tests, for instance, on the ground before the launch of the satellite. Then, with the satellite in orbit, a measurement of the pilot suppression can be used to measure the input backoff of the carrier to the TWT.

This method has been used in a Satellite Business System (SBS) satellite using demand assigned TDMA. The pilot has been put within the satellite transponder bandwidth of 43 MHz at a frequency 20 MHz below the center frequency of the channel. Because the transmission rate of the TDMA channel is 24 MSps (megasamples per second), the bandwidth-to-transmission rate is sufficiently high to allow the transmission of a measurable pilot without interfering with the data transmission. Since the data signal at this offset frequency is approximately 15 dB below the peak, a narrow pilot filter at the monitor station can be used to measure the pilot power in the presence of the data modulated carrier. This system requires that the data portion of the slot be sufficiently long to allow detection of the suppressed pilot. In the SBS system, the transmitted data is required to be a minimum of 50 $\mu$s and this condition is satisfied for quadrature phase-shift key (QPSK) transmission.

A more recent Intelsat system utilizing TDMA has operational characteristics that are different from the SBS approach. In the Intelsat system, the trandponder bandwidth is 72 MHz and the transmission rate is 60 MSps so that the spectral power density of the data signal anywhere within the transponder bandwidth is no lower than 6 dB below the peak, that is, at least 9 dB higher than the roll-off in the SBS system. If the pilot filter bandwidth is further reduced to compensate for this 9 dB rise of the data carrier in the vicinity of the pilot signal, the time period required to measure the pilot power becomes excessively long. This problem is worsened because in the Intelsat system the minimum length of data in the data segment is reduced from that in the SBS system to a minimum length of 4 $\mu$s.

Another useful parameter, besides input power back-off, to be measured in TDMA systems is the carrier-to-noise ratio which will give an indication of the expected bit-error rate on a particular channel and slot. The noise measurement must account for the fact that noise during data transmission is suppressed by a TWT operating near saturation.

SUMMARY OF THE INVENTION

Accordingly, it is an object of this invention to provide a method of measuring input back-off power for a TDMA communication system.

It is a further object of this invention to provide a method of measuring input back-off power for TDMA systems where the data transmission rate nearly fills the transponder band.

It is yet a further object of this invention to provide a method of measuring input back-off power in every slot of TDMA transmission.

Yet another object of this invention is to provide a method of measuring the carrier-to-suppressed-noise ratio for TDMA transmission.

The invention can be summarized as a method of measuring the input power back-offs of the traffic bursts in a TDMA transponder in which a CW pilot is transmitted to the transponder. The monitor station measures the intensity of the pilot signal during the guard time and then also during either the carrier recovery or the clock recovery. The intermodulation between the high level signal at center carrier frequency or the offset clock frequency with the pilot causes the pilot to be suppressed. The amount of suppression is a measurable or calculable function of the input power back-off and can be used to determine the input back-off. The traffic burst's carrier-to-noise ratio is determined by measuring power output of a filter centered at a center frequency during the carrier recovery and by measuring the noise through a noise filter centered away from known signals and their intermodulation products during the carrier recovery or clock recovery.

DETAILED DESCRIPTION OF THE PREFERRED EMBODIMENTS

Figure 1:
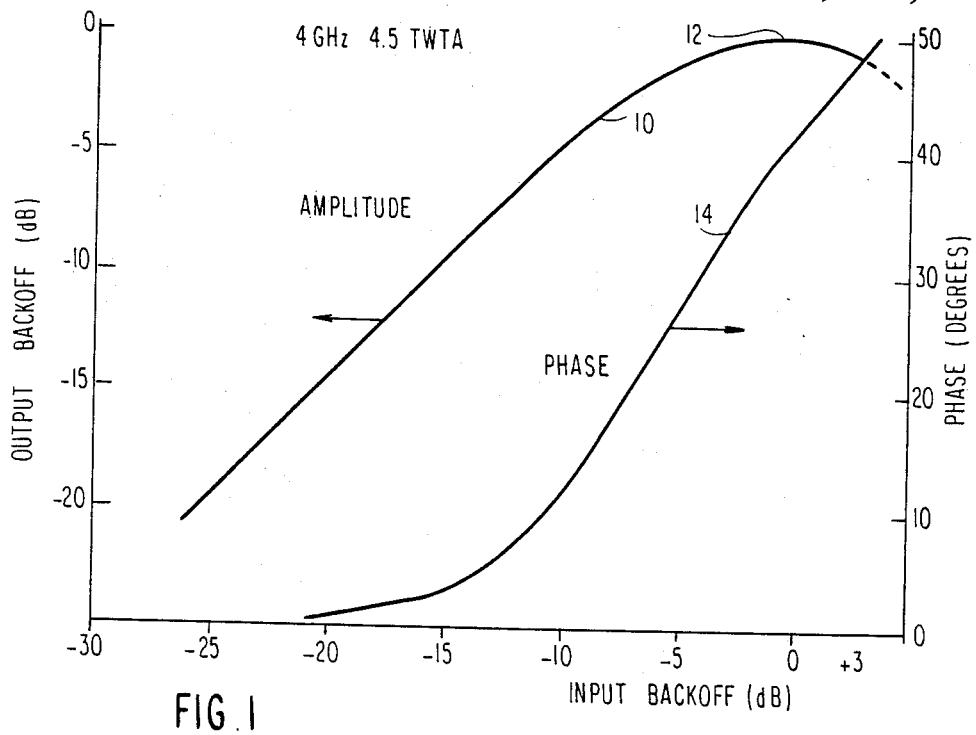
FIG. 1 is a graphical illustration of the relationship of amplitude and phase of the output signal of a TWT as a function of the input back-off power to the TWT.
Figure 2:
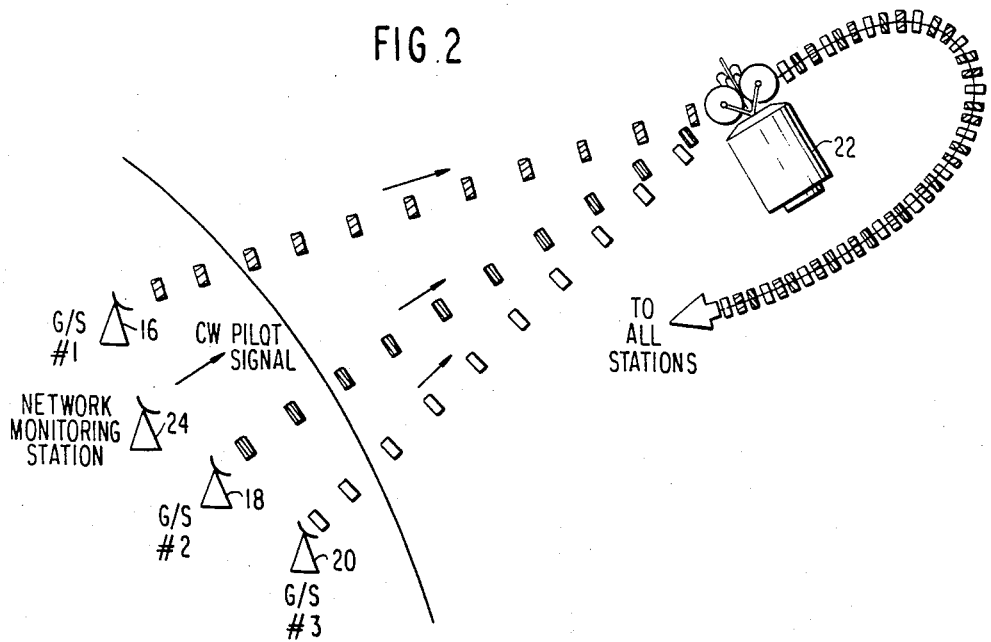
FIG. 2 is a schematic illustration of a global coverage TDMA communication system.
Figure 3:
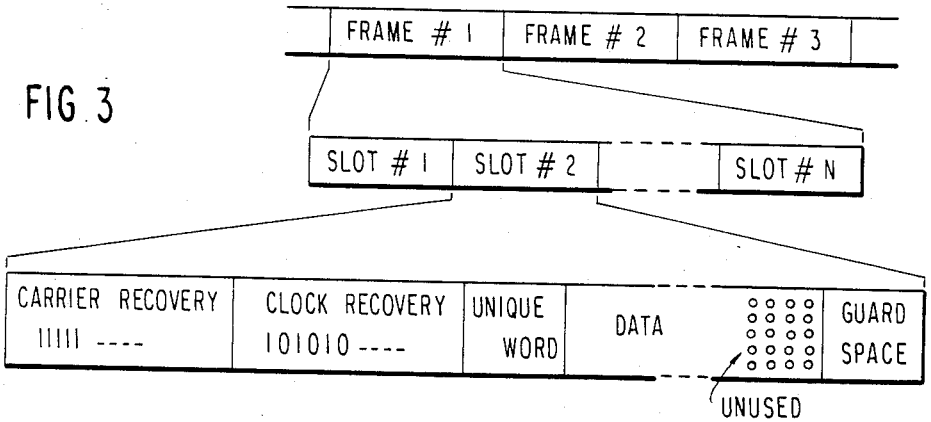
FIG. 3 illustrates the format of a TDMA transmission.

According to the invention, one station acts as network monitor for a time division multiple access (TDMA) communication system. The monitor station 24 may be a dedicated station or one of the ground stations 16–20 with added capabilities. The monitor station 24 transmits a low-level CW pilot signal during the entire time of every slot, including the guard time. The pilot signal is at a frequency offset by 15 MHz from the center frequency $f_c$ of the carrier which is near 14 GHz for the Intelsat uplink. The pilot frequency $f_p$ must fall within the 72 MHz bandwidth of the transponder and must also avoid the two CW components of the clock recovery signals appearing 30 MHz above and below the carrier frequency. The pilot power level should be selected such that it will not degrade the performance of the TDMA signal. For instance, the pilot may be 15 MHz below $f_c$ and have a power level 20 dB below the power level required to saturate the TWT. During the guard time, no carrier is being transmitted so that the uplink power spectrum appears as a guard time power spectrum 40 illustrated in FIG. 5 with only a single pilot signal 42 appearing.

Figure 4:
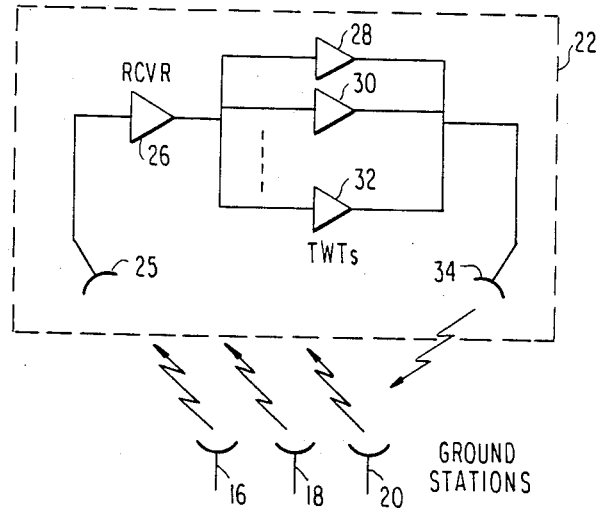
FIG. 4 is a schematic illustration of the major satellite subsystems.

The receiver 26 (FIG. 4) preamplifies this signal and frequency shifts it to near 11 GHz for the downlink. The preamplified signal is then sent to a TWT for power amplification. A representative input/output transfer function for the TWT is shown by graph 44 in FIG. 5. The output power spectrum for the guard space is shown by a power spectrum 46, which has been normalized to unit amplification and which does not include the frequency shifting by the receiver. During the TDMA guard spaces, there is only the single pilot signal 42 at the input so that only a single pilot output signal 48 appears within the bandwidth of the transponder. The pilot output signal 48 is then transmitted to all the ground stations including the monitor station which measures the intensity of the pilot signal 48 as a reference.

Figure 6:
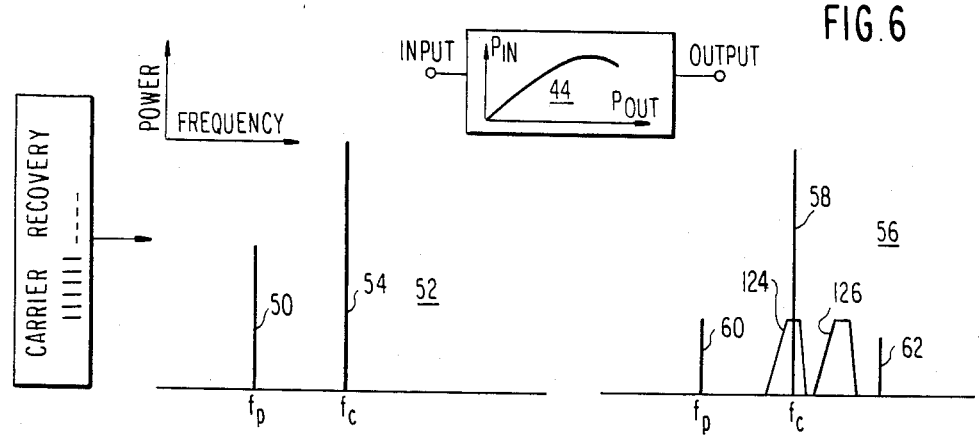

During the carrier recovery segment, the network monitoring station continues to transmit the pilot signal as represented in a carrier recovery power spectrum 52 shown in FIG. 6 and it also transmits an unmodulated carrier 54 at the carrier frequency $f_c$. The TWT receiving this power spectrum 52 produces an output power spectrum 56. Both a carrier signal 58 and a pilot signal 60 appear at their respective frequencies. However, if the TWT is operating in a non-linear region, that is, near or above saturation, there is an interaction between the carrier and the pilot which causes the intensity of the pilot output signal 60 to be suppressed relative to the value of the pilot signal 48 in the absence of the carrier. The intermodulation between the pilot and the carrier, which produces the suppression of the pilot signal 60, also produces an intermodulation pilot 62 offset from the carrier 58 by as much as the suppressed pilot 60 but on the opposite side.

Figure 9:
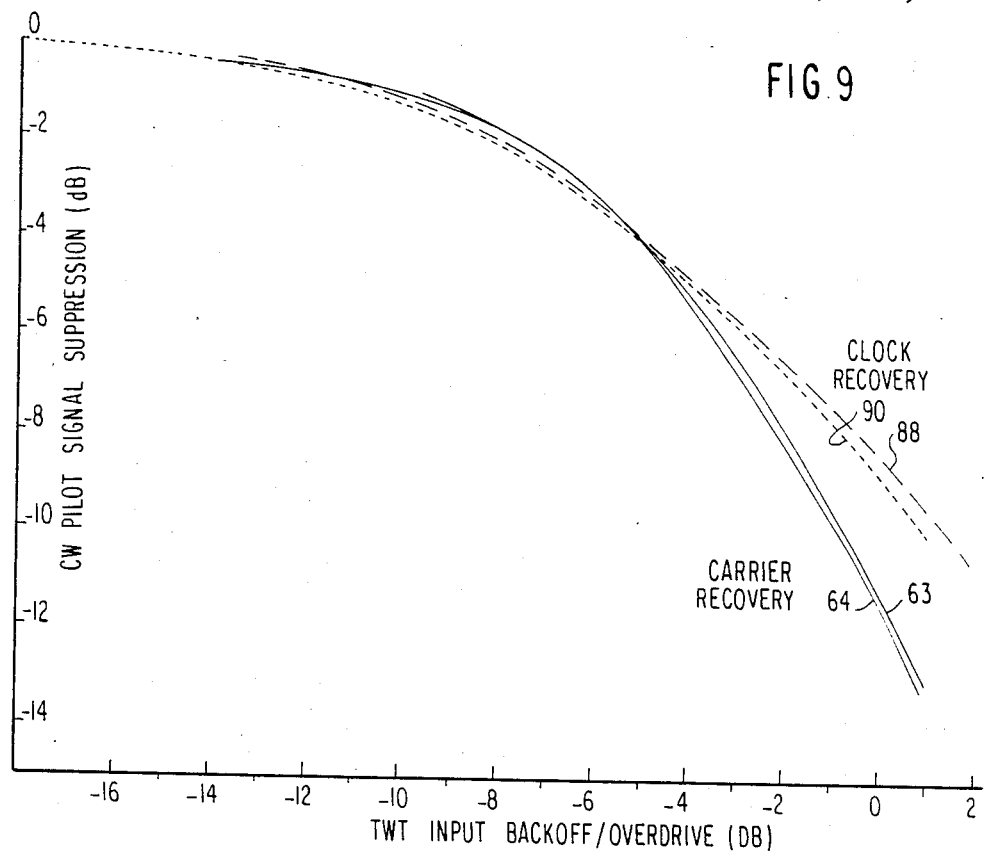
FIG. 9 is a graphical representation of the relation between the pilot suppression and the carrier input back-off during the carrier and clock recovery periods.

The suppression of the pilot signal, that is, the difference between the pilot level 48 without the carrier signal and the suppressed pilot level 60 in the presence of the carrier signal 58, is a measure of the power level of the carrier 58 at the input of the TWT. The relationship between the pilot signal suppression and the input back-off of the TWT is shown in FIG. 9. Curve 63 gives the experimentally determined relationship between the CW pilot signal suppression and the input back-off, that is the input power to the TWT relative to the saturation point 12. These characteristics need to be determined only once and they can be determined on the ground before the launch of the satellite. It is seen that at large values of input back-off to the left of FIG. 9 there is relatively little pilot suppression, indicating that the TWT is being operated in a nearly linear region. However, near the saturation point the amount of suppression is greatly increased. Thus, a measurement of the pilot suppression provides an accurate measure of the input back-off.

Rather than beforehand measuring the pilot suppression as a function of input back-off, it is possible to compute the pilot suppresion from the non-linear characteristics of the TWT using the amplitude and phase characteristics of the TWT shown in FIG. 1. This calculation requires a complex computer program which uses a Bessel function expansion of the curves of FIG. 1 to accurately model the amplitude and phase characteristics of FIG. 1. The program then calculates a theoretical curve 64 shown in FIG. 9 relating the pilot suppression to the input back-off. The experimental curve 63 closely follows the theoretical curve 64 so that either can be used to determine the input back-off from the pilot suppression.

Figure 5:
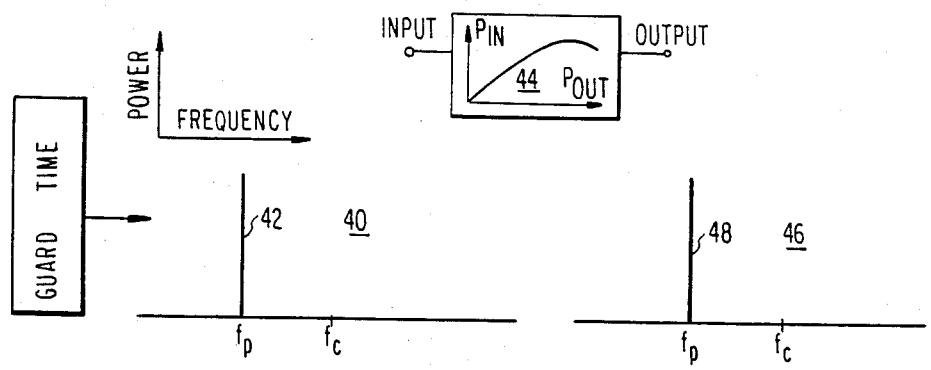
FIGS. 5, 6, 7 and 8 are schematic representations of the power spectra of the TDMA transmissions both at the input and the output of the TWT at the guard time, carrier recovery, clock recovery and data burst portions respectively of the TDMA format.

Thus, one method of practicing the invention is for the monitoring station to measure the pilot signal level 48 shown in FIG. 5 during the guard time in the absence of a carrier and to also measure the level of the suppressed pilot 60 in the presence of the carrier 58. The difference of these two levels is the pilot suppression which through the use of one of the curves 63 or 64 of FIG. 9 determines the input back-off power to the TWT. More details of the measuring system will be described later.

Figure 7:
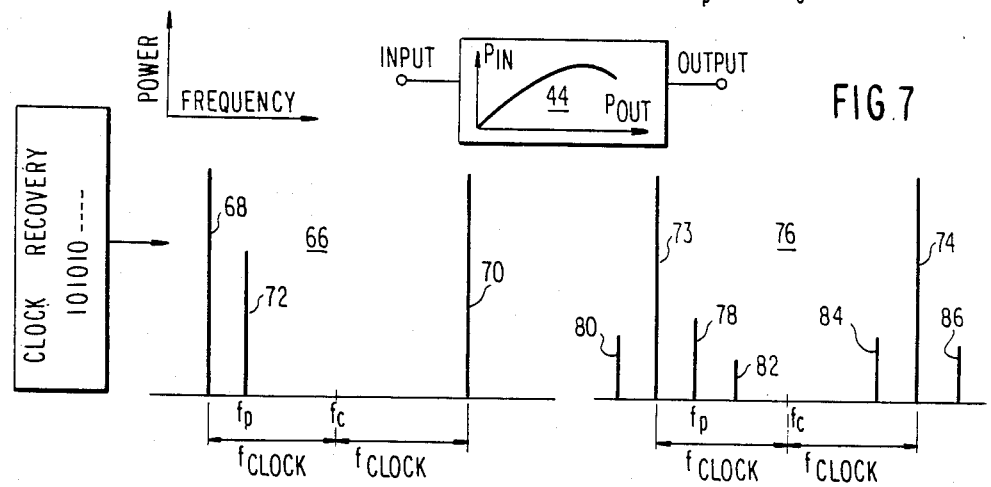

The pilot suppression can also be measured during the clock recovery segment. As illustrated by a clock recovery power spectrum 66 in FIG. 7, during the clock recovery period, the carrier is modulated by the data signal 101010 . . . . This results in two transmitted clock signals components 68 and 70 offset from the carrier frequency $f_c$ by the clock frequency $f_{clock}$. The monitoring station during the clock recovery segment is also transmitting a pilot signal 72. when the clock signal components 68 and 70 and the pilot signal 72 are amplified by the non-linear TWT, two output clock signal components 73 and 74 as shown in a power spectrum 76 are produced. A suppressed pilot 78 is also produced. The level of the suppressed pilot 78 during clock recovery segment is below the level of the pilot 48 in the guard time in the absence of the clock signals 72 and 74. Thus a determination of the amount of suppression of the suppressed pilot 78 relative to the unsuppressed pilot 48 is a measure of the level of the input signals 68 and 70 and thus of the carrier level. During the clock recovery segment, the TWT also produces intermodulation products 80, 82, 84 and 86 produced by the three input signals 68, 70 and 72. The frequencies of the intermodulation produces are the well-known sums and differences of the pilot frequency, clock frequency and carrier frequency, such as $2f_c-f_p$, $2f_c-f_p+f_{clock}$, $2f_p-f_c$, $3f_c-2f_p$, etc. It is important that the pilot frequency be placed such that it avoids any low order intermodulation product if a simple determination of the pilot suppression is to be made.

The amount of pilot suppression during clock recovery segment can be experimentally determined as a function of the carrier input back-off just as was previously discussed for an unmodulated carrier during the carrier recovery period. An experimentally determined curve 88 is shown in FIG. 9. A corresponding theoretical curve 90 once again closely follows the experimental curve.

Thus, the invention can also be practiced by the monitoring station measuring the unsuppressed pilot 48 in the absence of any carrier during the guard time and measuring the suppressed pilot 78 in the presence of the clock signal components 72 and 74 during the clock recovery period. The difference between these two power levels is the pilot suppression during clock recovery segment which can be related to the input back-off at the TWT by using one of the curves 88 or 90 shown in FIG. 9.

Figure 8:
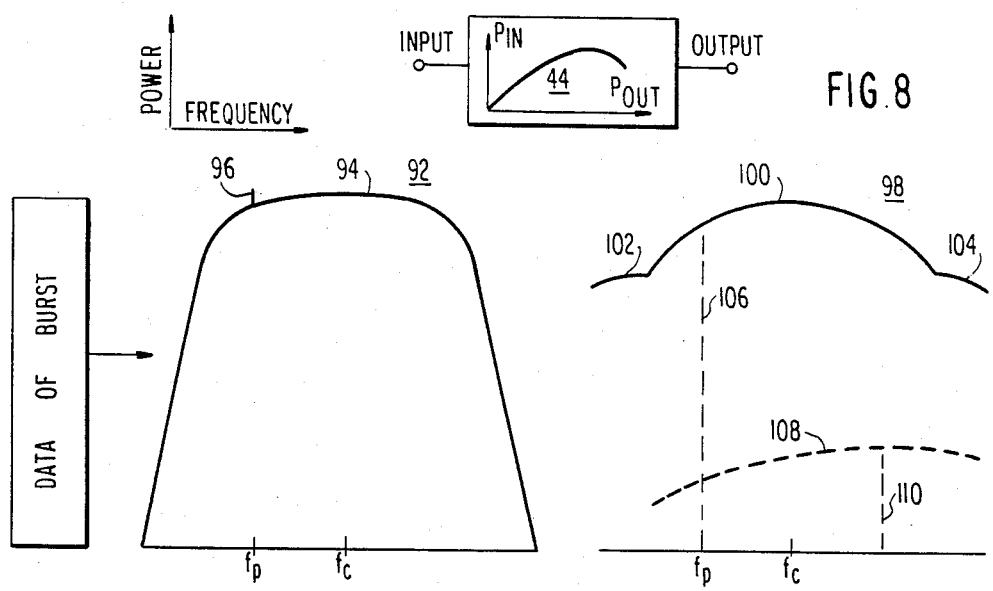

A data burst spectrum 92 shown in FIG. 8 is a typical power spectrum of a QPSK modulated carrier during the data burst. A data stream signal spectrum 94 extends over most of the transponder bandwidth. Also shown is a pilot signal 96. The energy scale on the power spectrum 92 is different from that of the power spectra during the guard time or the preamble. Although the pilot signal 76 is shown as being within the bandwidth of the data signal 94, its power level is chosen to be 20 dB below that of the data signal 94 so that the CW pilot 96 does not interfere with data transmission. The output of the TWT is represented by a power spectrum 98. The data signal has a broad spectrum 100 and two lower level spill-over bands 102 and 104 produced by the operation of the TWT in its non-linear region. The spill-over bands 102 and 104 overflow into neighboring channels and if their intensity is too high will interfere with those neighboring channels. The object of the invention is to keep the TWT near saturation but not excessively into the overdrive region in which the spill-over bands 102 and 104 become large. The suppressed pilot 106 is reduced in magnitude so that it is difficult to detect during the data burst. The intermodulation products between the pilot 96 and the data stream 94 consist of a broad band 108 and an intermodulation pilot 110. Both these signals 108 and 110 have a low enough level as to be unimportant in the presence of data signal 100.

Figure 10:
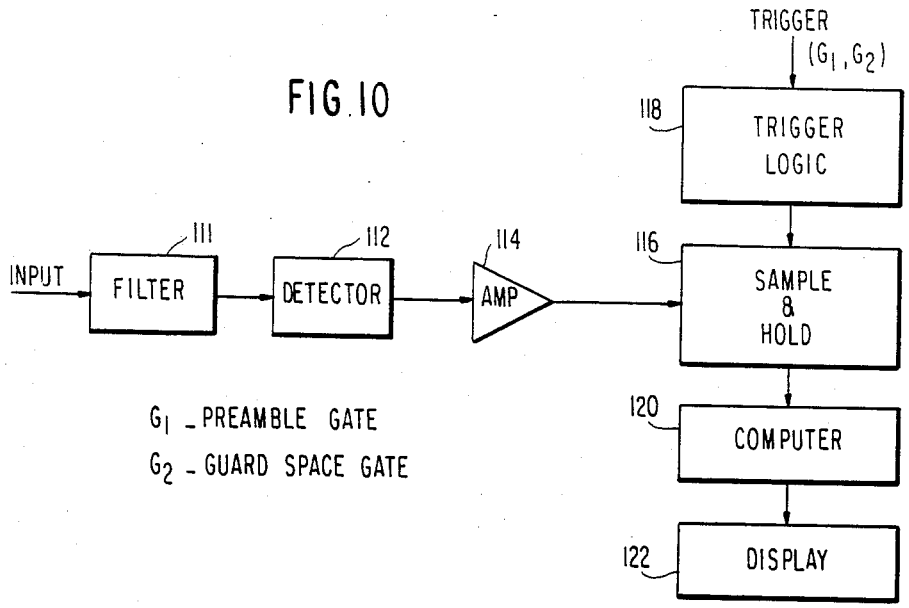

An example of the power monitoring circuitry necessary for the practice of the invention is shown in FIG. 10. The monitoring station 24 receives the transmissions of the satellite 22 and inputs them to a filter 111 tuned to the pilot frequency and the desired bandwidth. The power level output of the detector 112 is amplified by an amplifier 114 before being inputted to a sample-and-hold circuit 116. The sample-and-hold 116 is triggered by two gating signals $G_1$ and $G_2$ that are conditioned by a trigger logic 118 to properly trigger and gate the sample-and-hold 116. The first gating signal $G_1$ is synchronous with the start of the carrier recovery or clock recovery segment of the selected traffic burst preamble, depending on whether the pilot suppression is measured during the carrier or clock recovery segments. The second gating signal $G_2$ is synchronous with a preassigned guard space within the TDMA frame. Both gating signals $G_1$ and $G_2$ require synchronization to the TDMA network and further requires dynamic tracking of any network changes. However such synchronization is also required for a TDMA ground station 16–20 either transmitting or receiving signals in the TDMA format so that their generation is easily handled by conventional TDMA terminals.

In a preassigned and fixed network, the TDMA terminal tracks the frame reference burst and generates preamble synchronous gate $G_1$ of the traffic burst from the known network assignment information. In case of a demand assigned network, the burst assignment information is contained within the frame reference burst. Hence, the TDMA terminal can obtain the assignment information by decoding the frame reference burst and set up the timing gate $G_1$ using this information. The guard space gating signal $G_2$ can be displaced from $G_1$ by a fixed time.

The output of the sample-and-hold 116 is read by a computer 120 and the ratio of the power levels gated by the gating signals $G_1$ and $G_2$ is then displayed on a display 122. This ratio is the pilot suppression. The display unit 122 can be advantageously arranged to separately display the input back-offs for each slot of the frame. Also the computer 120 can use the relations given in FIG. 9 to convert pilot suppression to input back-off so that the back-off values are directly displayed on the display 122.

The link carrier-to-noise ratio measurement for each of the traffic bursts can also be measured during the preamble segment of each burst. The CW carrier measurement can be performed using a bandpass filter 124 centered at the carrier signal 58 at $f_c$ during the carrier recovery portion of the preamble as shown in FIG. 6.

Noise also is suppressed by the TWT in the presence of a high level carrier. The measurement of suppressed noise can be performed with a noise filter 126 centered at a frequency within the bandwidth of the transponder but spaced away from the suppressed pilot 60, the carrier signal 58 and the intermodulation products during the carrier recovery segment, such as the intermodulation pilot 62. Alternatively, the suppressed noise can be measured during the clock recovery segment of the preamble. In this case, the noise filter must be centered away from the suppressed pilot 68, the two clock signal components 72 and 74 and their intermodulation products 80–86, all shown in FIG. 7, and must have filtering characteristics to avoid these signals. From the two measurements of the carrier level 58 and the suppressed noise, the total carrier-to-suppressed noise ratio is obtained for each burst.

The uncertainty in measuring the suppressed pilot during the preamble portion can be significantly reduced by measuring the suppressed noise with a filter having the same bandwidth as the suppressed pilot detection filter and correcting the suppressed pilot plus noise measured during the preamble. The carrier-to-noise measurement can be performed with a scheme similar to FIG. 10 with appropriate changes in timing and bandwidth.

The invention, as described above, allows a separate measurement of the input back-off, as well as the carrier-to-noise ratio if desired, for every traffic burst from each ground station. Because the measurements can be centralized at the network monitoring station, the input back-offs for the different bursts can be compared.

Thus, problems can be localized to the individual ground stations, to the TWT of a particular channel, or common elements such as the receiver or satellite antennas. Jitter in the input back-off is often associated with meteorological conditions near the transmitting ground station. If the input back-off from a particular ground station is consistently high (overdrive), the transmitting power of that station should be reduced. If the input back-off of that station, and that one along, is consistently too low (underdrive), the pointing of its antenna should be reexamined or its transmitting power increased. If all the slots in all the channels are consistently in an under drive condition, then the problem is probably a mis-directed satellite receive antenna or an under-amplifying receiver, while overdrive on all slots indicates an over-amplifying receiver. If all the slots in just one of the channels are consistently in an overdrive or underdrive condition, the problem is probably localized to the channel subsystems and their associated circuitry. Depending on the occurrence and distribution of incorrect back-off, the operator of the monitor station can initiate appropriate corrective action.

We claim:

1. In a communication system of the type having a remote amplifier for receiving, power amplifying and retransmitting signals transmitted thereto, a method of measuring carrier input power to said remote amplifier when the latter is used in a time division multiple access format wherein transmission bursts include at least a guard time of no carrier transmission, a carrier recovery time of unmodulated carrier, and a clock recovery time of the carrier modulated by a clock signal, said carrier and clock recovery times being a preamble, said method comprising the steps of:

transmitting to said amplifier a pilot signal different in frequency from said carrier but within the bandwidth of said amplifier, said pilot signal arriving at said amplifier at least during said guard time and said preamble;

measuring the power level of the pilot signal output by the amplifier during the guard time;

measuring the power level of the pilot signal output by the amplifier during the preamble;

comparing the two said measurements of the pilot signal, the difference being a pilot level suppression;

relating the pilot level suppression to the carrier input power according to a known relation.

2. A method for measuring carrier input power as recited in claim 1, further comprising the steps of:

transmitting a carrier of known input power to the amplifier;

measuring the pilot signal output by the amplifier in the presence of said known input power;

varying said known input power of said carrier;

measuring the pilot signal output by the amplifier in the absence of said known input power, the difference between the measured pilot signal outputs in the absence and the presence of the carrier being the pilot level suppression related to the carrier input power.

3. A method for measuring carrier input power, as recited in claim 1, further comprising the steps of:

measuring the output signal level and phase change of said amplifier as a function of signal level input to said amplifier to produce amplifier characteristics; and calculating the pilot level suppression as a function of said signal level input from said characteristics to produce said relation of said pilot level suppression to the carrier input power, the pilot level suppression being the difference between the pilot level output in the absence and the presence of said signal level output.

4. A method for measuring carrier input power, as recited in claim 1, wherein the step of measuring during the preamble occurs when an unmodulated carrier is being transmitted.

5. A method for measuring carrier input power, as recited in claim 1, wherein the step of measuring during the preamble occurs when a carrier modulated by a clock signal is being transmitted.

6. A method for measuring carrier input power, as recited in claim 1, wherein one station continuously transmits said pilot signal and said station measures said power levels of the pilot signal.

7. A method for measuring carrier input power, as recited in claim 4, wherein one station continuously transmits said pilot signal and said station measures said power levels of the pilot signal.

8. A method for measuring carrier input power, as recited in claim 5, wherein one station continuously transmits said pilot signal and said station measures said power levels of the pilot signal.

9. A method for measuring carrier input power and a carrier-to-suppressed noise ratio as recited in claim 1, further comprising the steps of:

measuring the carrier signal output by said amplifier during a portion of the preamble wherein an unmodulated carrier is being transmitted; and measuring noise power in a portion of the bandwidth of the output of the amplifier during the preamble, said bandwidth portion excluding any transmitted signals during said measurement and any substantial intermodulation products of said transmitted signals, the ratio of the measured carrier signal and the measured noise being the carrier-to-suppressed noise ratio.

10. A method for measuring carrier input power, as recited in claim 9, wherein one station continuously transmits said pilot signal and said station measures said power levels of the pilot signal.

* * * * *